Nov. 23, 1937.  D. COLLINS  2,099,798
PEDAL MECHANISM
Filed Sept. 13, 1933   2 Sheets-Sheet 1
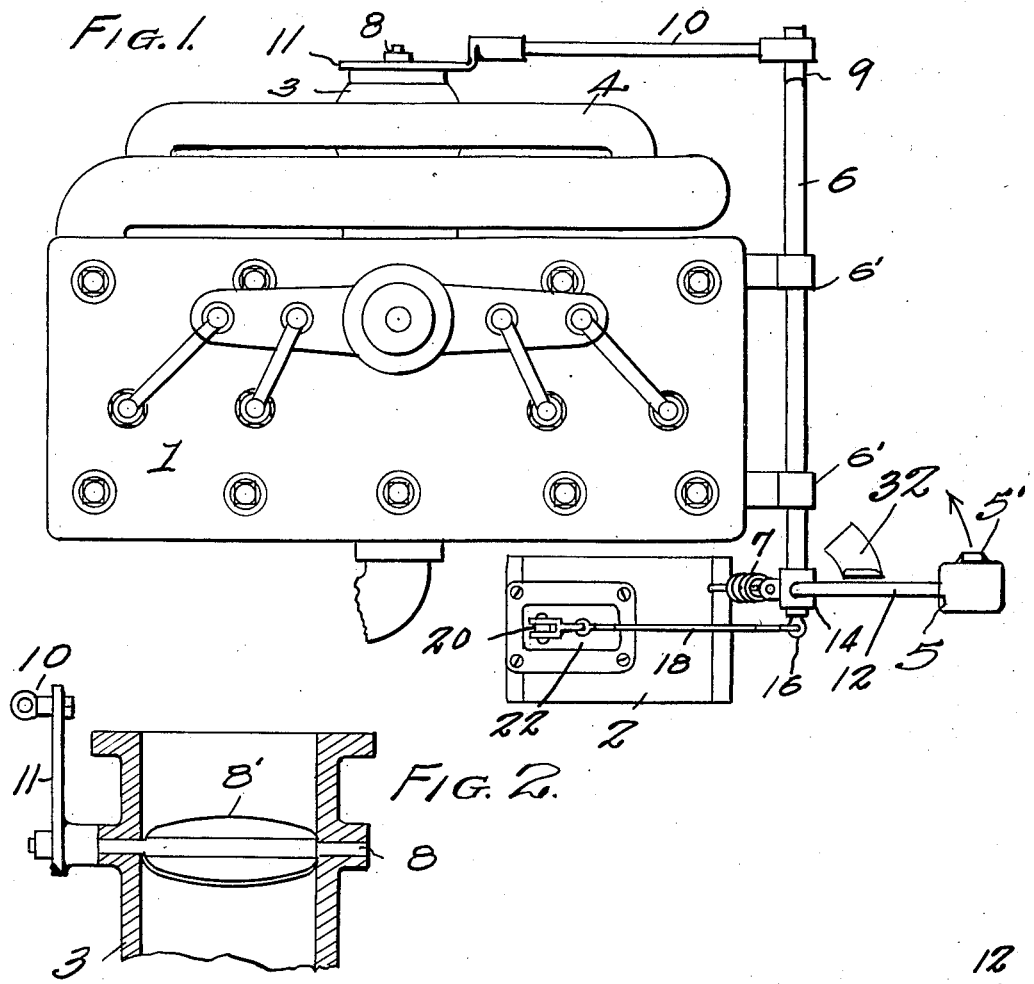
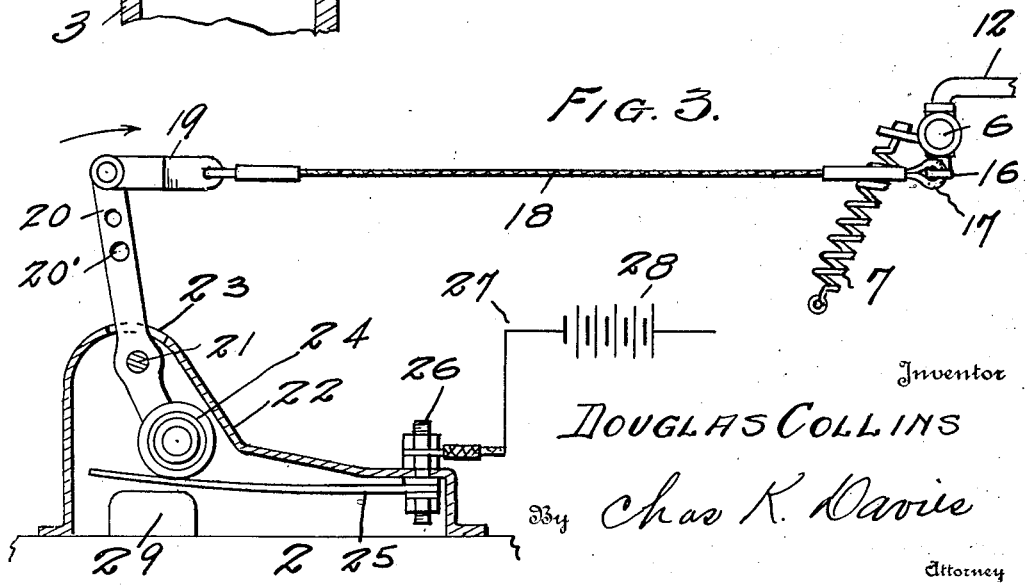
Inventor
DOUGLAS COLLINS
By Chas K. Davis
Attorney Nov. 23, 1937.   D. COLLINS   2,099,798
PEDAL MECHANISM
Filed Sept. 13, 1933   2 Sheets-Sheet 2
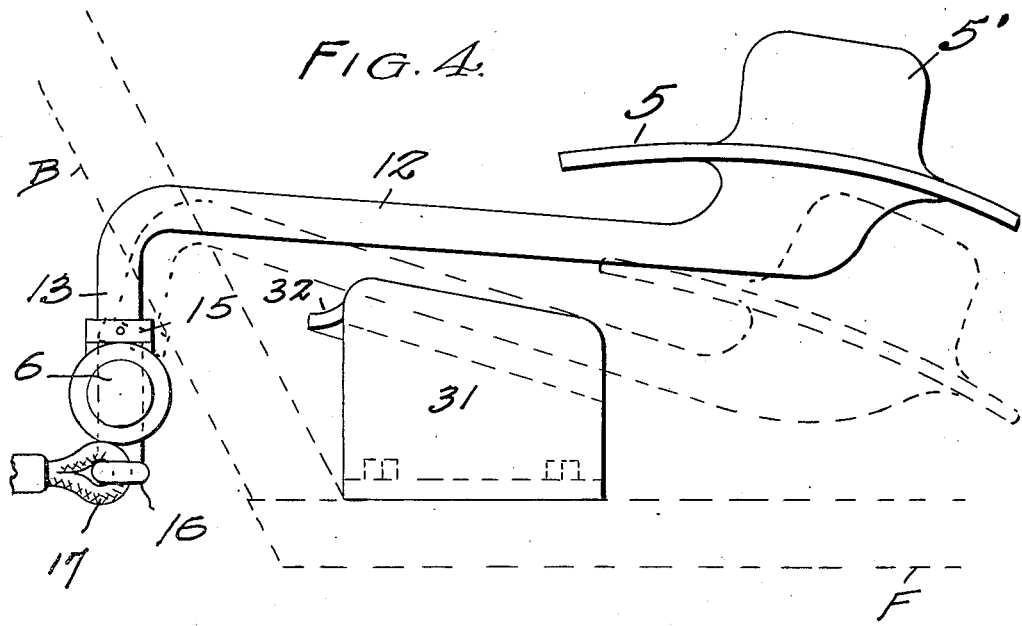
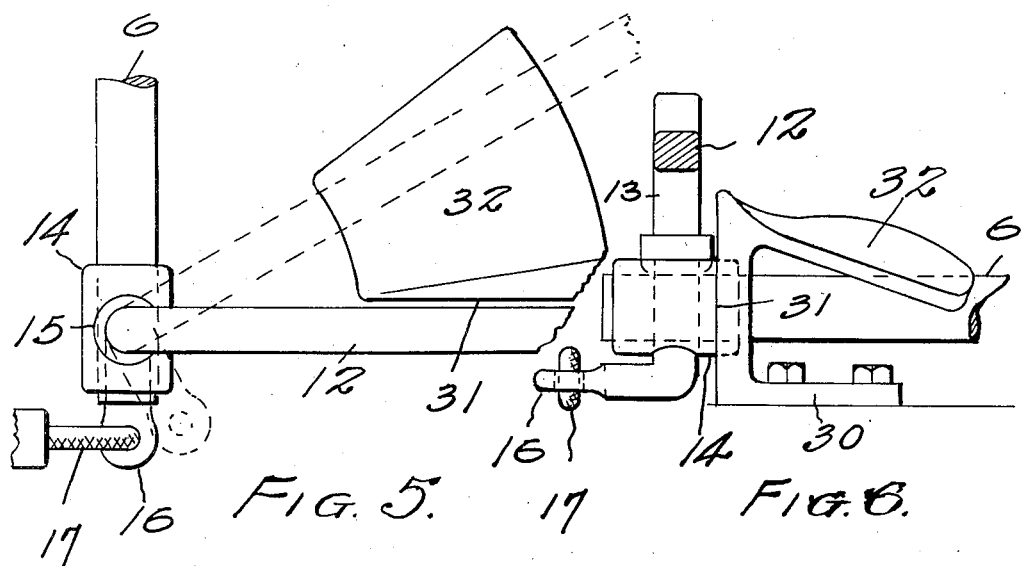
Inventor
DOUGLAS COLLINS
By Chas K. Davis
Attorney Patented Nov. 23, 1937

2,099,798

UNITED STATES PATENT OFFICE 2,099,798

PEDAL MECHANISM

Douglas Collins, Salisbury, N. C.

Application September 13, 1933, Serial No. 689,317

6 Claims. (Cl. 123—179)

My present invention relates to improvements in pedal mechanism of the combination type, and which is especially designed for use in connection with the starting operations of an internal combustion engine. By means of the combination pedal of my invention the electric switch of the electric starting motor is closed at the proper time, and the fuel feed to the cylinders of the engine is also controlled in usual manner. The invention is utilized on automotive vehicles as a single control device for the starter and the throttle, and the functions of these two accessories of the engine are controlled by the car driver through manipulation of the pedal by means of one and the same foot, and without necessity for removing the foot from the pedal or accelerator.

In carrying out my invention I pivotally arrange the pedal or accelerator with relation to the rock shaft of the fuel control mechanism in such manner that the pedal or accelerator may be depressed as usual for control of the fuel feed, and in addition the pivotal relation between the pedal and the shaft permits the pedal to be manipulated to actuate the operating mechanism of the switch for the electric starting motor of the engine.

Means are provided whereby the electric switch for the starting motor is held in open position at all times except when the starter is to be employed, and the operating mechanism between the pivoted pedal and the switch lever is available at all times for use when pivotal movement of the pedal is desired.

The essence of the invention resides in the construction and arrangement of the pedal or accelerator whereby the usual pivotal movement of the pedal, or its depression with the rock shaft as an axis, is accomplished, and also whereby the pedal is laterally pivoted on a vertical axis which passes through the axis of the rock shaft, and the invention consists in certain novel combinations and arrangements of parts as will hereinafter be more fully set forth and claimed. In the accompanying drawings I have illustrated one complete example of the physical embodiment of my invention wherein the parts are combined and arranged according to one mode I have thus far devised for the practical application of the principles of my invention, but it will be understood that various changes and alterations may be made in the exemplified structure, within the scope of my claims, without departing from the principles of my invention.

Figure 1 is a top plan view of a conventional internal combustion engine with its fuel control mechanism and starting motor, and showing the pedal mechanism of my invention applied thereto.

Figure 2 is a sectional detail view of the throttle of the engine.

Figure 3 is a detail view partly in section showing the switch for the electric starter of the engine, together with the pedal mechanism and operating means for the switch.

Figure 4 is an enlarged side view of the pedal mechanism, showing by dotted lines a depressed position of the pedal or accelerator.

Figure 5 is a top plan view showing parts of Figure 4, and indicating by dotted lines the pivotal movement of the pedal for operating the starter switch.

Figure 6 is a view in elevation as seen from the right in Figure 4, with the pedal lever in section.

In order that the general assembly and utility of parts may readily be understood I have illustrated in Figure 1 a conventional internal combustion engine 1 with the usual electric starting motor or starter 2 at one side of the engine, and the carbureter 3 at the other side of the engine. The intake manifold is indicated as 4, while the foot pedal or accelerator 5 is illustrated in any suitable position for manipulation and depression by the foot of the driver of an automobile with which the engine is equipped.

The pedal or accelerator 5 is depressed as usual to rock the fuel control rock shaft 6 in its bearings 6' and the rock shaft is returned to proper position and held there by means of a spring as 7, when the engine is not running. By means of the pivot pin 8, the throttle 8' is mounted in the inlet pipe, and the throttle is operated from the rock shaft 6 through the use of a crank arm 9 on one end of the shaft, the link 10 and the lever 11, as usual.

The pedal 5 is fashioned with an upright lug 5' that projects upwardly at the right side of the pedal and this lug is in position to be engaged by the foot of the driver as his foot rests upon the pedal or accelerator 5, in order that the pedal may be swung laterally for the purpose of energizing the starter 2 when the engine is to be started or cranked.

An integral lever 12 projects forward from the pedal, and the lever has an angular or downwardly extending shank 13 which passes through a transverse hole in the rock shaft 6, and also through an enlarged portion or sleeve 14 rigid with the rock shaft. The shank fits neatly within the holes of the shaft and sleeve, and it is pivotally supported in these members by suitable means, as by a bearing collar or ring 15 secured to the shank and resting upon the exterior of the sleeve or shaft. At its lower end, after passing through the rock shaft, the shank of the lever is fashioned with a laterally extending, perforated, foot 16, which forms an eye for the attachment of a loop or eye 17 of a flexible cord or wire 18, and this flexible wire 18 may be connected, in suitable manner, as by a clevis 19 to the outer free end of the starting switch lever 20 that is fashioned with holes 20' for pivotal connection with the wire 18 or with the clevis at the end of the wire 18. The wire may of course be attached to any one of the holes 20' for the purpose of varying the leverage of the switch lever and for adjusting the parts to varying conditions found in different types of engines and starters.

The switch lever is pivoted at 21 in a housing 22, which is slotted at 23 to accommodate the lever, and this housing of the starter switch, while illustrated for convenience as mounted on the starter 2, may be located at various desirable positions depending on the installation of my invention.

On the inner end of the switch lever, within the housing, a roller 24 of nonconducting material is journaled, and this roller is in position to contact with and ride on the upper face of a resilient blade 25, which is located within the housing in a substantially horizontal position. At one end the spring blade or resilient blade or conductor 25 is fixed by means of nuts on the terminal post or bolt 26 to which a wire 27 is connected, and a battery 28 is indicated as part of the starting circuit for the electric starter 2.

The spring blade or conductor 25 forms the movable contact member of the starter switch, and the button or head 29, within the housing, forms the stationary contact member of the switch.

The spring blade 25 possesses sufficient resiliency or tension to hold the roller 24 and the switch lever within the housing, over to the right in Figure 3 to prevent contact between the blade and the button or head, and the tension of the spring blade also holds the wire 18 taut, as indicated in Figure 3.

The spring blade is pressed down, against its tension, into contact with the button 29 to close the switch, when the upper outer end of the switch lever is swung to the right in Figure 3 causing the roller 24 to ride down the spring blade into frictional and electrical contact with the stationary contact member 29.

This closing action of the lever is accomplished by lateral pressure of the foot against the lug 5' which pressure swings the pedal lever on its pivotal shank 13 as a center, and the short, angular foot-lever 16 is thus caused to swing, as indicated by dotted lines in Figure 5, and pull on the taut wire 18 for the purpose of operating the switch lever.

Preferably, the tension of the spring blade 25 is greater than the usual throttle spring 7, and the tension of the blade 25 is sufficient to hold the lever 20 against accidental movement that might unwittingly close the switch.

To act as a guide for the pedal when the throttle alone is being manipulated, and to prevent excessive throttle movement when the engine is being cranked or started, I employ a bracket 30 that is supported or mounted in suitable position adjacent to the lever 12 to guide the lever when the pedal is depressed for fuel feed control. This bracket may be bolted to the floor F of the automobile just back of the foot-board B, and located at the right side of the lever 12, with the straight, vertical face 31 of the bracket in position to prevent lateral swing to the right of the lever when the pedal is being depressed for fuel control only.

For cranking or starting the engine, however, the lever may be swung across the top of the bracket, as indicated by dotted lines in Figure 5, and the bracket is fashioned with a laterally extending flange 32 having an upper cam face that declines from the top edge of the bracket and across which cam face the lever may ride, as the lever swings on the shank 13 as a center and is at the same time depressed on the axis of the rock shaft as a center.

Thus, to crank or start the engine, the pedal lever is swung to the right on the shank as a center, across the top of the bracket, and simultaneously depressed. The lateral swing of the lever causes the closing movement of the switch lever to close the switch, and the depressing movement of the pedal controls the admission of fuel to the engine. The elevated position of the flange 32, as indicated in Figure 6 prevents excessive depression of the pedal that would cause "wide open" movement of the throttle, but the pedal, of course, may be depressed the required distance to feed the starting supply of fuel to the engine.

After the engine is started and is running, pressure of the foot is released from the pedal to permit the spring 25 to return the pedal to position for throttle control only, i. e. the spring swings the pedal to the left, and the lever thereafter is depressed alongside of the vertical wall or face 31 of the bracket. The return of the pedal to straight front-and-rear position, of course results in opening of the starter switch, as described, and the switch is not again closed until re-cranking or starting is necessary.

By this simple manipulation of the pedal the fuel supply and the starter switch, both, are controlled, when necessary, and as the mechanism is simple in construction and embodies a minimum number of parts, repairs and adjustments of parts are practically eliminated while a reliable and rugged control device is assured.

Having thus fully described my invention, what I claim as new and desire to secure by Letters Patent is:—

1. In combination with a throttle and starting motor for an internal combustion engine, a rock shaft, a pedal having a lever mounted to rock the shaft, a shank on the lever having a pivotal bearing on the rock shaft, operative connections between the shaft and throttle, and operative connections between the lever-shank and the starting motor.

2. In combination with a throttle and electrical starting switch for an internal combustion engine, a rock shaft and connections therefrom to said throttle, a pedal having a lever mounted to rock the shaft and pivotally supported in said shaft, and operative connections from said lever to said starting switch.

3. The combination with a throttle and electrical starting switch for an internal combustion engine, of a rock shaft and operative connections therefrom to said throttle, a depressible lever mounted to rock the shaft and pivotally supported therein, a foot lever rigid with the depressible lever, and operative connections from one of said levers to the starting switch.

4. The combination with a throttle and electrical starting switch for an internal combustion engine, of a rock shaft and operative connections from said shaft to the throttle, a depressible lever mounted to turn with the shaft, operative connections from said lever to the starting switch, and said lever having a pivotal bearing-support extending transversely of the shaft, whereby the lever may independently be swung in its bearing-support and be depressed.

5. The combination with a throttle and electrical starting switch for an internal combustion engine, of a rock shaft and operative connections from said shaft to the throttle, a depressible lever mounted to turn with the shaft, operative connections from said lever to the starting switch, and said lever having a pivotal bearing support extending transversely through the shaft, whereby the lever may independently control the throttle and the starting switch.

6. In a pedal mechanism, the combination with a rock shaft, of a depressible lever pivotally mounted in said shaft, a bracket having a vertical guide face for the lever in a single depressing movement, and a laterally extending cam face on said bracket for guiding the lever in a combined depressing and swinging movement.

DOUGLAS COLLINS.